United States Patent
Ishibashi (10) Patent No.: US 7,198,379 B2
(45) Date of Patent: Apr. 3, 2007

(54) LENS FOR ELECTRONIC DEVICE AND DISK DEVICE HAVING SAME

(75) Inventor: Hiroshi Ishibashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 85 days.

(21) Appl. No.: 10/995,244

(22) Filed: Nov. 24, 2004

(65) Prior Publication Data
US 2005/0135082 A1   Jun. 23, 2005

(30) Foreign Application Priority Data
Nov. 27, 2003   (JP)   ............. P.2003-397432

(51) Int. Cl.
*G01D 11/28*   (2006.01)

(52) U.S. Cl. .......... 362/30; 362/29; 362/612; 362/615

(58) Field of Classification Search ........ 362/611–612, 362/617, 621, 623, 628, 330, 253, 311, 606–610, 362/30, 29, 23
See application file for complete search history.

(56) References Cited

U.S. PATENT DOCUMENTS

| | | | | |
|---|---|---|---|---|
| 4,282,560 A | * | 8/1981 | Kringel et al. ............... 362/26 |
| 4,792,884 A | * | 12/1988 | Suman et al. ............... 362/135 |
| 5,404,277 A | * | 4/1995 | Lindblad ..................... 362/631 |
| 5,678,912 A | * | 10/1997 | Ayres et al. .................. 362/23 |
| 5,860,722 A | * | 1/1999 | Tai et al. .................... 362/603 |
| 2003/0117789 A1 | * | 6/2003 | Nowak ........................ 362/27 |
| 2004/0076010 A1 | * | 4/2004 | Kuo ........................... 362/332 |

FOREIGN PATENT DOCUMENTS

JP   A-2001-110224   4/2001
JP   A-2003-197003   7/2003

* cited by examiner

*Primary Examiner*—Renee Luebke
*Assistant Examiner*—Robert J. May
(74) *Attorney, Agent, or Firm*—Morgan, Lewis & Bockius LLP (57) ABSTRACT

An electric device includes flat acrylic lens, and a blue light emitting diode. The lens includes bottom face upon which light is incident from the diode; front face from which light is emergent; pair of side portions opposed to each other and inclined by a predetermined angle with respect to the front face and the bottom face; and back face arranged so that end portions of the pair of side can be connected, substantially making a right angle with the bottom face. The pair of side portions reflects the light sent from the bottom face in the direction of the front face. When the side portions are directed to the back face, an inclination angle of the side plate with respect to the bottom face portion gradually comes close to a right angle.

5 Claims, 5 Drawing Sheets

LENS FOR ELECTRONIC DEVICE AND DISK DEVICE HAVING SAME

BACKGROUND OF THE INVENTION

1. Field of the Invention

The present invention relates to electronic device, and more particularly relates to the electronic device having a disk player in which a lens from which light emitted from a light source is emergent.

2. Description of the Related Art

A conventional lens (light guiding plate) is well known, upon which light is incident from a light source and from which the light is emergent being diffused. (For example, refer to JP-A-2001-110224 and JP-A-2003-197003) JP-A-2001-110224 discloses a conventional face light emitting device having a light guiding plate (lens) for guiding light, which is emitted from one LED (Light Emitting Diode), from the side and for sending the light from a light emitting face, the shape of which is rectangular when it is viewed on the plane.

JP-A-2003-197003 discloses a structure in which one light source (LED) is arranged in the periphery of one of the sides of a rectangular linear light emitting body and the light emitted from the light source is emergent from a linear light emitting face. JP-A-2003-197003 discloses a structure capable of obtaining an annular emission of light by combining a plurality of sets, which include a fan-shaped light guiding plate and one light source, with each other. In this case, each set includes: a fan-shaped light guiding plate having an arcuate light emitting face; and one light source (LED) arranged on the side of the light guiding plate on the arcuate center side while the light emitting direction is being directed to the arcuate light emitting face.

In this connection, a conventional disk player (electronic device) is well known which includes an acrylic lens, which is long from side to side, for emitting light sent from two light sources.

Figure 11:
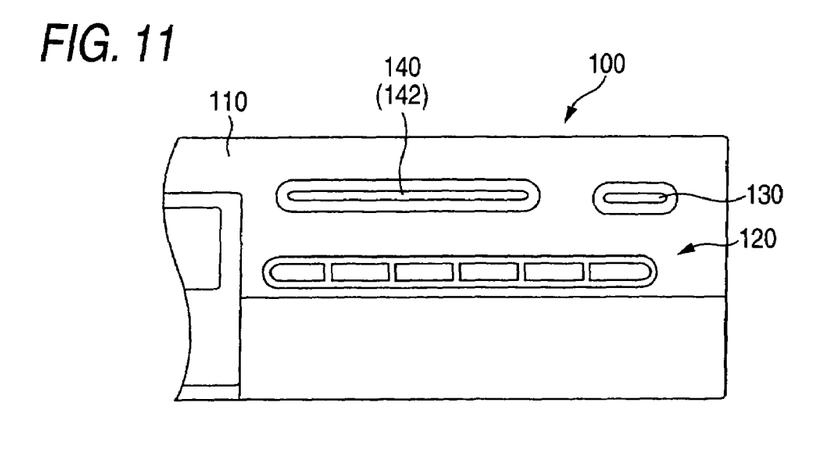
FIG. 11 is a view partially showing a conventional disk player.
Figure 12:
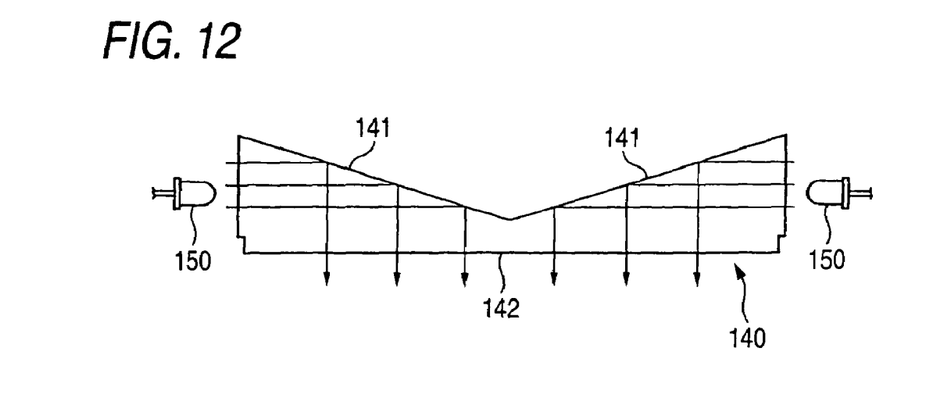
FIG. 12 is an upper face view showing an acrylic lens of the conventional disk player illustrated in FIG. 11.
Figure 13:
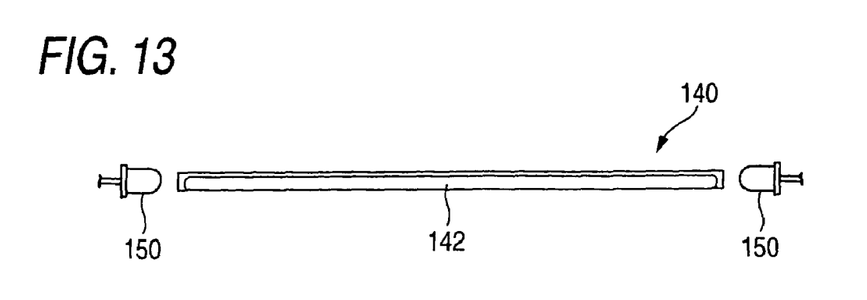
FIG. 13 is front face view showing the acrylic lens illustrated in FIG. 12.

FIG. 11 is a view partially showing a conventional disk player. FIG. 12 is an upper face view showing an acrylic lens incorporated into the conventional disk player shown in FIG. 11. FIG. 13 is a front face view of the acrylic lens shown in FIG. 12. Referring to FIGS. 11 to 13, the structure of the conventional disk player 100 will be explained below.

As shown in FIG. 11, the conventional disk player 100 includes: a front panel 110 for covering the front face of the disk player 100; an operation button 120 provided on the front panel 110; a picture recording button 130; and an acrylic lens 140, the shape of which is flat. As shown in FIGS. 12 and 13, at positions distant-from both end portions of the acrylic lens 140 by the substantially same distance, two light emitting diodes 150, which are light sources, are arranged. The acrylic lens 140 is attached inside the disk player 100 so that the acrylic lens 140 can be exposed from the inner face of the control panel 110 to the front face. This acrylic lens 140 is provided for letting a user know that the disk player 100 is in a state of picture recording when the picture recording button 130 is operated. As shown in FIGS. 12 and 13, the acrylic lens 140, the shape of which is flat, includes: a pair of back face portions 141 on which the incident light is reflected; and a front face portion 142, which is long from side to side, from which the reflected light is emergent so that the light can be emitted from the front face portion 142. The pair of back face portions 141 are formed into a V-shape with respect to the front face portion 142 so that the pair of back face portions 141 can be opposed to each other.

Next, explanations will be made into a mechanism in which light is reflected by the acrylic lens 140 of the conventional disk player 100. Light is incident upon the acrylic lens 140 from both end portions of the acrylic lens 140 by two light emitting diodes 150. As shown in FIG. 12, the incident light is reflected to the front face portion 142 by the pair of back face portions 141 and emergent from the front face portion 142, the shape of which is long from side to side.

SUMMARY OF THE INVENTION

In order to emit light from the front face portion 142 of the acrylic lens 140, the shape of which is long from side to side, shown in FIGS. 11 to 13, in order to uniformly emit light from the entire front face portion 142, the shape of which is long from side to side, it is conventionally necessary to arrange two light emitting diodes 150 on the sides of the acrylic lens 140. As a result, such a problem is caused that the number of parts is increased.

The structure disclosed in JP-A-2001-110224 is proposed to obtain a light emission, the shape of which is facial. Therefore, according to the structure disclosed in JP-A-2001-110224, it is difficult to obtain a linear light emission which is long from side to side.

In the structure disclosed in JP-A-2003-197003 in which one light source is arranged in the periphery of one side of the rectangular linear light emitting body and light sent from the light source is emergent from the linear light emitting face, when the linear light emitting face is formed into a shape, which is long from side to side, and the length of the linear light emitting face is long, the light sent from the light source can not reach an end portion on the opposite side to the light source. As a result, according to the structure disclosed in JP-A-2003-197003, it is difficult that light is uniformly emitted from the light emitting face, the shape of which is long from side to side, by using one light source (LED). In the structure disclosed in JP-A-2003-197003 in which the light emitting face is formed into an arcuate shape, since one LED is arranged in such a manner that the light emitting direction is directed to the arcuate light emitting face, it is difficult that light is uniformly emitted from the arcuate light emitting face, the divergent angle of which larger than a predetermined angle, because the divergent angle of LED is restricted by the directivity of LED. As a result, it is difficult that light is uniformly emitted from the light emitting face, the shape of which is long from side to side.

The present invention has been accomplished to solve the above problems. It is an object of the present invention to provide a disk player and electronic device in which light can be uniformly emitted from the entire light emitting face, the shape of which is long from side to side, by one light source (light emitting diode).

According to the first aspect of the invention, there is provided a disk player comprising: a front panel made of resin for covering a front face of a device, including a panel side through-hole, which is long from side to side, formed at a predetermined position; a lens holder provided on the inner face side of the front panel, engaged in the panel side through-hole which is long from side to side and formed on the front panel, including a through-hole, which is long from side to side, for a lens formed at a predetermined position; a lens made of acrylic resin, the shape of which is flat, fixed to the lens holder; and a light emitting diode attached to a base board provided in the device, wherein the lens made of acrylic resin, the shape of which is flat, is formed into a substantial trapezoid when it is viewed on the plane, the lens made of acrylic resin, the shape of which is flat, including: a bottom face portion upon which light is incident from the light emitting diode; an upper face portion, on the surface of which white printing is conducted for reflecting light; a front face portion, which is linear and long from side to side, arranged so that the front face portion can be exposed from the through-hole, which is long from side to side, for the lens of the lens holder to the front face, light being emergent forward from the front face portion; a pair of side portions, which are opposed to each other, for reflecting light sent from the bottom face portion to the front face portion, the pair of side portions being inclined by a predetermined acute angle on the plane with respect to the front face portion and also inclined by a predetermined acute angle with respect to the bottom face portion, fine irregularities being formed on the surfaces of the pair of side portions; and a back face portion provided so that end portions of the pair of side portions can be connected, making a substantial right angle with the bottom face portion, fine irregularities being formed on the surface of the back face portion, wherein the pair of side portions are formed so that an inclination angle with respect to the bottom face portion can gradually come close to a right angle as the pair of side portions is directed to the back face portion, and the light emitting diode, the number of which is one, is arranged upward at a predetermined position below the bottom face portion of the lens.

In the disk player according to the first aspect of the present invention, as described above, a pair of side portions, which are opposed to each other, are inclined by a predetermined acute angle on the plane with respect to the front face portion and also inclined by a predetermined acute angle with respect to the bottom face portion, and one light emitting-diode is arranged upward at a predetermined position below the bottom face portion of the lens. Due to the above structure, light incident from the bottom portion can be reflected in the direction of the front face portion by the pair of side portions.

Therefore, the light incident from the bottom face portion can be effectively emergent from the front face portion. Due to the foregoing, when light is incident from the bottom face portion, the light can be effectively emitted from the linear front face portion, the shape of which is long from side to side, which is a light emitting face. Accordingly, it is possible for one light emitting diode to make the entire front face portion, the shape of which is long from side to side, emit light effectively. When white printing is conducted on the surface of the upper face portion of the lens, the shape of which is flat, as compared with a case in which white printing is not conducted on the surface of the upper face portion of the lens, the light incident from the bottom face portion can be effectively emergent from the entire front face portion, the shape of which is long from side to side. When the back face portion is formed substantially making a right angle with the bottom face portion, the light incident from the bottom face portion can be suppressed from being reflected in the direction of the front face portion by the back face portion. Due to the foregoing, it is possible to prevent the occurrence of a problem in which a large quantity of light reflected by the lens converges upon the periphery of the center of the front face portion, the shape of which is long from side to side, of the lens, and the shape of the light emitting diode reflects in the periphery of the center of the front face portion.

Therefore, it is possible to prevent the light emergent from the front face portion of the lens from deviating to one portion. When fine irregularities are formed on the surfaces of the pair of side face portions and the back face portion of the lens, it is possible to diffuse the light incident from the bottom face portion when the light is reflected by the pair of side face portions and the back face portion. Therefore, the light emergent from the front face portion, the shape of which is long from side to side, of the lens can be made uniform.

According to the second aspect of the invention, there is provided an electronic device comprising: a light source; and a lens, the shape of which is flat, including a bottom face portion upon which light is incident from the light source, further including a front face portion, the shape of which is long from side to side, from which the light is emergent, and furthermore including a pair of side portions, which are opposed to each other, inclined by a predetermined acute angle on the plane with respect to the front face portion, also inclined by a predetermined acute angle with respect to the bottom face portion, wherein the pair of side portions reflect light sent from the bottom face portion in the direction of the front face portion.

In the electronic device according to the second aspect of the present invention, as described above, a pair of side portions, which are opposed to each other, are inclined by a predetermined acute angle on the plane with respect to the front face portion and also inclined by a predetermined acute angle with respect to the bottom face portion. Therefore, the light incident from the bottom face portion can be reflected in the direction of the front face portion, the shape of which is long from side to side, by the pair of side face portions. Accordingly, the light incident from the bottom face portion can be effectively emergent from the front face portion, the shape of which is long from side to side, which is a light emitting face. Due to the foregoing, when the light is incident from the bottom face portion, the light can be effectively emitted from the front face portion, the shape of which is long from side to side. Therefore, the light can be effectively emitted from the entire front face portion, the shape of which is long from side to side, by one light source.

In the electronic device according to the second aspect of the present invention, it is preferable that the lens, the shape of which is flat, further includes an upper face portion, on the surface of which printing is conducted for reflecting light. Due to the above constitution, as compared with a case in which printing for reflecting the light is not conducted on the surface of the upper face portion of the lens, the light incident from the bottom face portion can be effectively reflected in the direction of the front face portion by the upper face portion. Therefore, the light incident from the bottom face portion can be effectively emergent from the entire front face.

In the electronic device according to the second aspect of the present invention, it is preferable that the lens, the shape of which is flat, is provided so that end portions of the pair of side portions can be connected, the lens further includes a back face portion making a substantial right angle with the bottom face portion, and the pair of side portions are formed so that an inclination angle with respect to the bottom face portion can gradually come close to a right angle as the pair of side portions are directed to the back face portion. Due to the above constitution, it is possible to suppress the light, which is incident from the bottom face portion, from being reflected in the direction of the front face portion by the back face portion. Due to the foregoing, it is possible to prevent the occurrence of a problem in which a large quantity of light reflected by the lens converges upon the periphery of the center of the front face portion of the lens, and the shape of the light source reflects in the front face portion. Therefore, it is possible to prevent the light emergent from the front face portion of the lens from deviating to one portion.

In this case, it is preferable that fine irregularities are formed on the surface of at least one of the pair of side portions and the back face portion. Due to the above constitution, when the light incident from the bottom face portion is reflected by the pair of side portions and the back face portion, the light can be diffused. Therefore, the light emergent from the front face portion of the lens can be made uniform.

BRIEF DESCRIPTION OF THE DRAWINGS

These and other objects and advantages of this invention will become more fully apparent from the following detailed description taken with the accompanying drawings in which.

DESCRIPTION OF THE PREFERRED EMBODIMENTS

Referring to the drawings, an embodiment of the present invention will be explained below.

Figure 1:
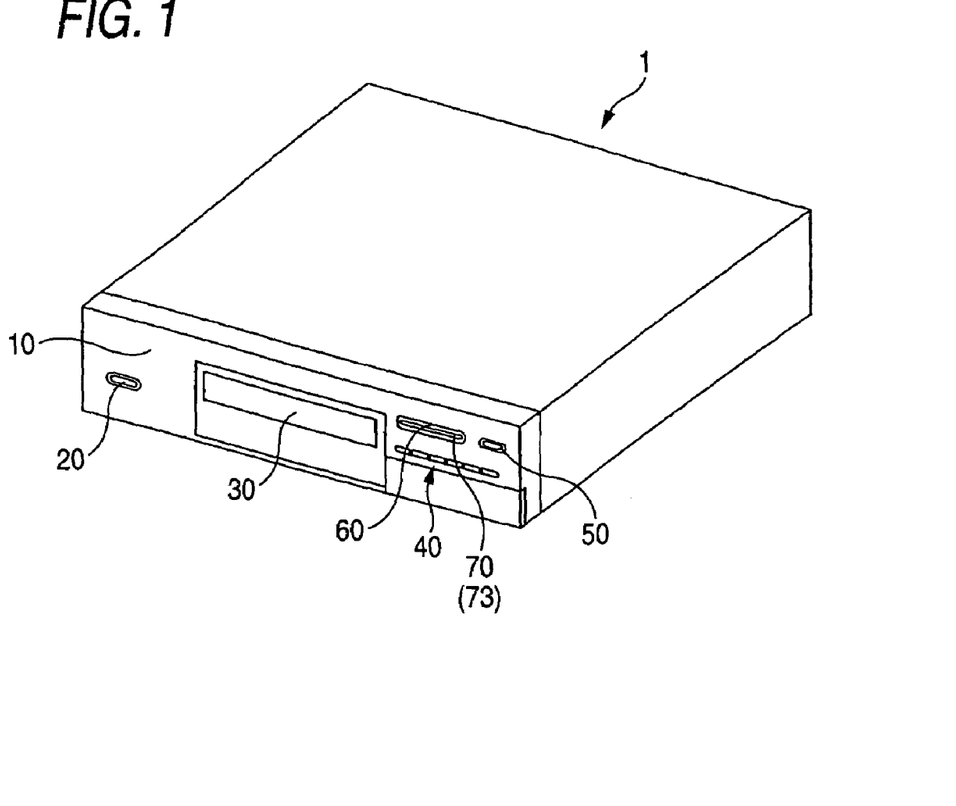
FIG. 1 is a perspective view showing a disk player of an embodiment of the present invention.
Figure 2:
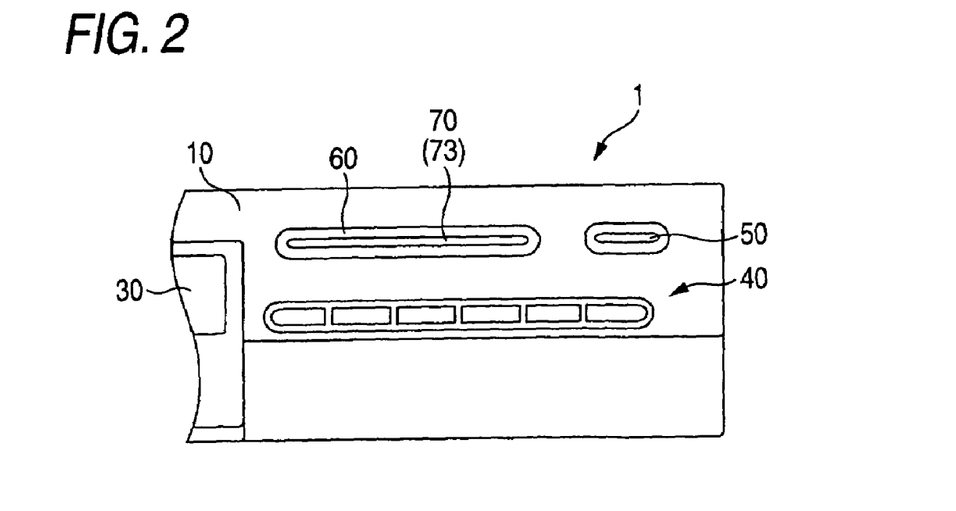
FIG. 2 is a front view partially showing the disk player illustrated in FIG. 1.
Figure 3:
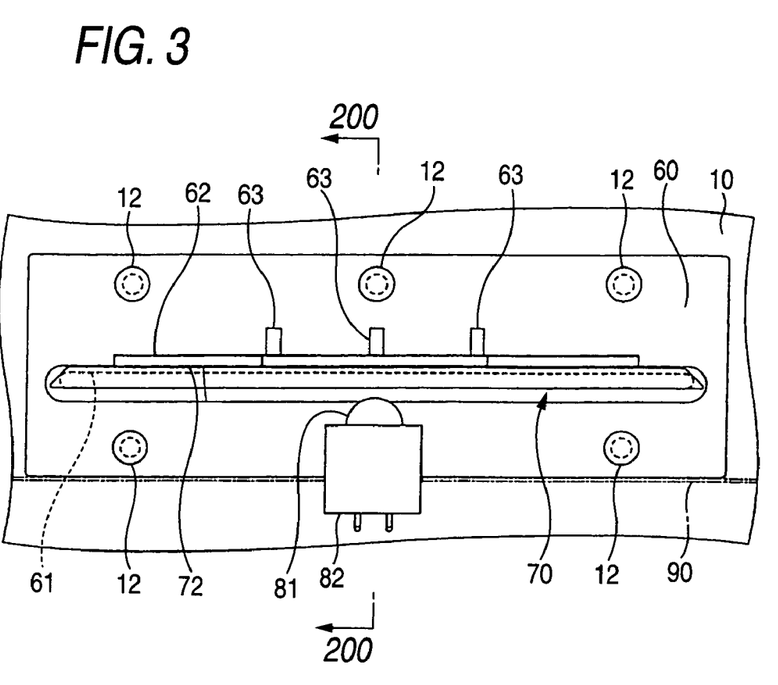
FIG. 3 is a view partially showing a back face of the disk player illustrated in FIG. 2.
Figure 4:
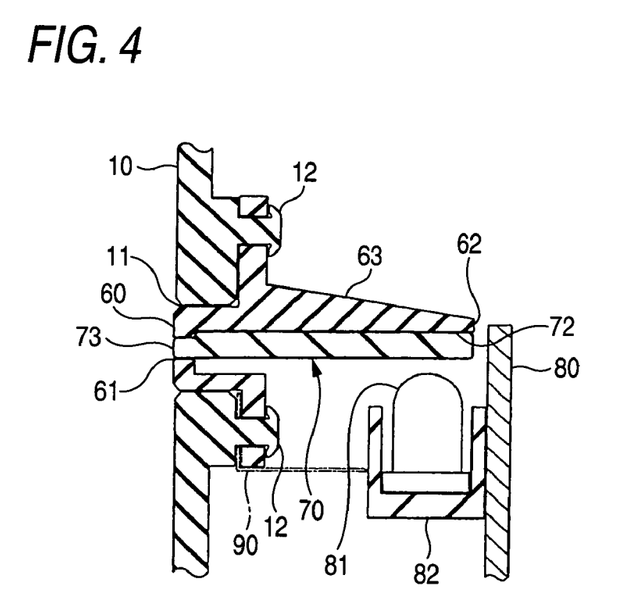
FIG. 4 is a sectional view taken on line 200—200 in FIG. 3.

FIG. 1 is a perspective view showing a disk player of an embodiment of the present invention. FIGS. 2 to 4 are views showing a portion of the structure of the disk player shown in FIG. 1. FIGS. 5 to 9 are views showing the structure of an acrylic lens incorporated into the disk player of an embodiment of the present invention. Referring to FIGS. 1 to 9, the structure of the disk player of an embodiment of the present invention will be explained as follows.

As shown in FIGS. 1 and 2, the disk player 1 of the embodiment of the present invention includes: a front panel 10 made of resin; a power source button 20; a disk insertion port 30; an operation button 40; a picture recording button 50; a lens holder 60 made of resin; and an acrylic lens 70, the shape of which is flat. The acrylic lens 70 is provided for letting a user know that the disk player 1 is operated in either compact disk mode or hard disk mode in the embodiment of the present invention. In this connection, the disk player 1 is an example of "the electronic device" of the present invention, and the acrylic lens 70 is an example of "the lens" of the present invention. As shown in FIGS. 3 and 4, the front panel 10 includes: a panel side through-hole 11, which is long from side to side; and a plurality of boss portions 12. The lens holder 60 made of resin includes: a linear through-hole 61, which is used for a lens, the shape of which is long from side to side; and three reinforcing ribs 63. As shown in FIG. 4, the lens holder 60 is fitted into the panel side linear through-hole 11, the shape of which is long from side to side, and fixed to the front panel 10 by the plurality of boss portions 12 integrally formed on the front panel 10 made of resin. The protruding portion 62 is provided for fixing and supporting the acrylic lens 70. Further, the protruding portion 62 functions as a light shielding member.

In this embodiment, as shown in FIG. 4, the disk player 1 includes a base board 80, which is arranged inside the disk player 1. One blue light emitting diode 81 is attached to this base board 80 by the diode holder 82. In this connection, the blue light emitting diode 81 is an example of "the light emitting diode" and "the light source" of the present invention. As shown in FIGS. 3 and 4, this one blue light emitting diode 81 is arranged upward at a predetermined position below the acrylic lens 70. As shown in FIGS. 3 and 4, the light shielding sheet 90 made of polyester is provided in the periphery of the one blue light emitting diode 81. This light shielding sheet 90 is provided for preventing the light, which is emitted from the blue light emitting diode 81, from leaking out to the front face of the front panel 10 from portions except for the acrylic lens 70.

Figure 5:
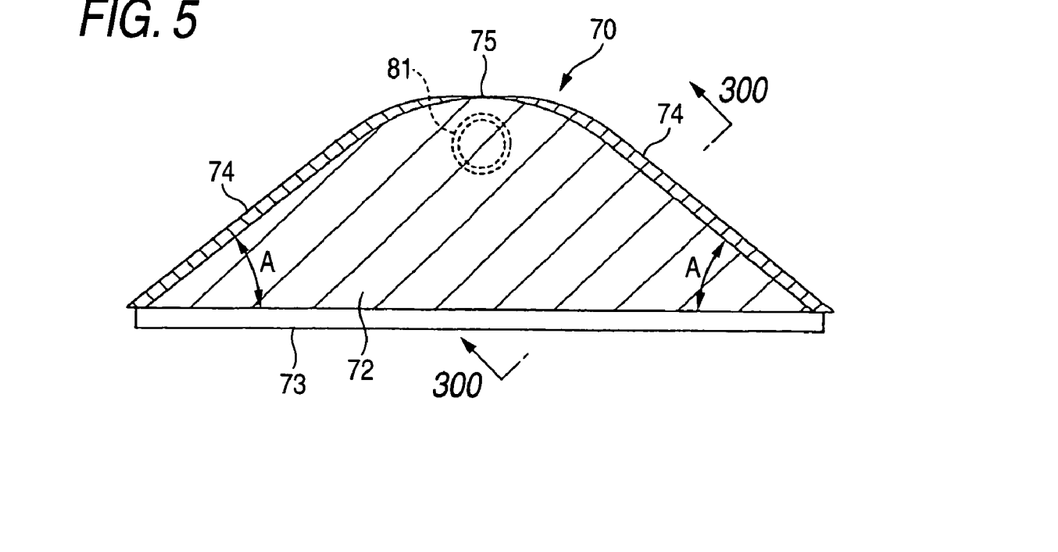
FIG. 5 is an upper view showing an acrylic lens of the disk player of the embodiment of the present invention shown in FIG. 1.
Figure 6:
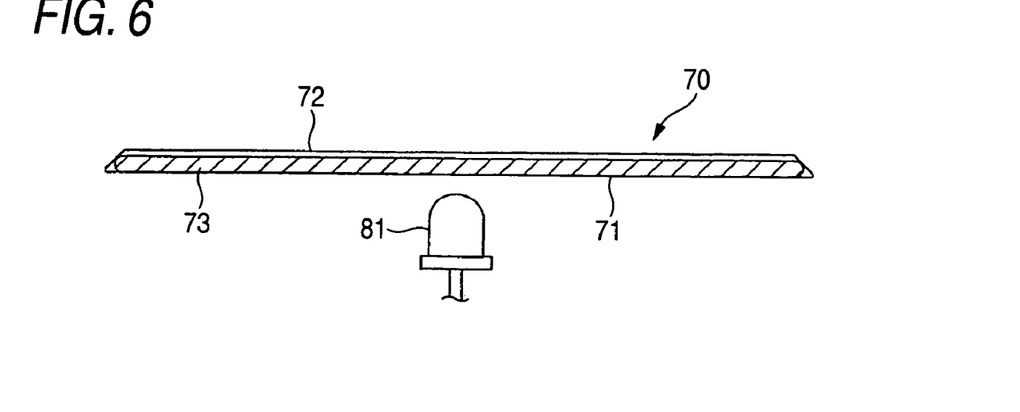
FIG. 6 is a front view showing the acrylic lens illustrated in FIG. 5.
Figure 7:
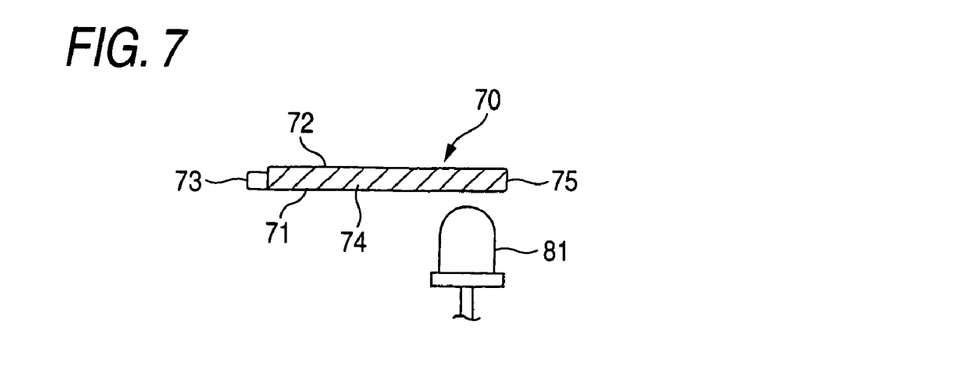
FIG. 7 is a side view showing the acrylic lens illustrated in FIG. 5.
Figure 8:
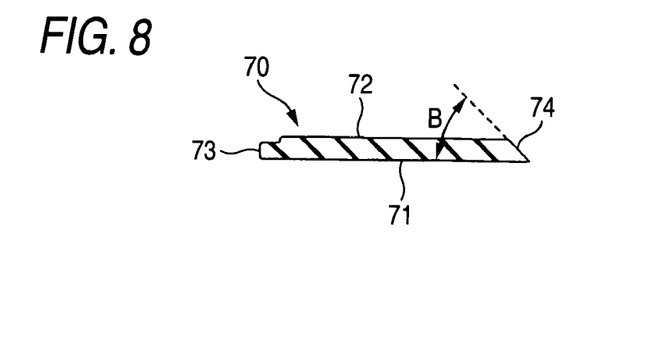
FIG. 8 is a sectional view taken on line 300—300 in FIG. 5.
Figure 9:
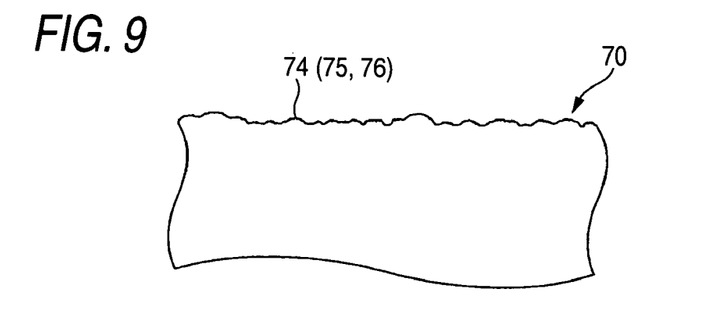
FIG. 9 is a partially enlarged view showing fine irregularities formed on the surface of the acrylic lens illustrated in FIG. 5.

In the present embodiment, as shown in FIGS. 5 to 8, the acrylic lens 70, the shape of which is flat, includes: a bottom face portion 71; an upper face portion 72; a linear front face portion 73, the shape of which is long from side to side; a pair of side portions 74; and a back face portions 75. The bottom face portion 71 is a face upon which the light emitted from the blue light emitting diode 81 is incident. As shown in FIG. 5, white printing for reflecting light is conducted on the surface of the upper face portion 72. As shown in FIG. 4, the front face portion 73, the shape of which is long from side to side, is arranged in such a manner that the front face portion 73 is exposed to the front face of the front panel 10 from the through-hole 61 for the lens, the shape of which is long from side to side, of the lens holder 60. This linear front face portion 73, the shape of which is long from side to side, is a face from which the light getting into the acrylic lens 70 is emergent. As shown in FIG. 9, on the front face 73, a large number of fine irregularities are formed by means of crimping. These fine irregularities are provided for diffusing the emergent light when the light is emergent from the front face portion 73.

In the present embodiment, as shown in FIG. 5, the pair of side faces 74 are inclined by predetermined angle A (about 30 degrees in the present embodiment) on the plane with respect to the front face 73. Further, as shown in FIG. 8, the pair of side faces 74 are inclined by predetermined angle B (about 45 degrees in the present embodiment) on the plane with respect to the bottom face portion 71. As shown in FIG. 9, on the surfaces of the pair of side portions 74, large number of irregularities are formed by means of crimping. The back face portion 75 is provided so that end portions of the pair of side face portions 74 can be connected. Further, the back face portion 75 is provided so that it can make a right angle with the bottom face portion 1. As shown in FIG. 9, on the surface of the back face portion 75, a large number of irregularities are formed by means of crimping. Fine irregularities on the surfaces of the pair of side face portions 74 and the back face portion 75 are provided for diffusing the light by the irregular reflection when the light is reflected by the pair of side face portions 74 and the back face portion 75. As shown in FIG. 5, the pair of side face portions 74 are formed so that the inclination angle (about 45 degrees in the present embodiment) with respect to the bottom face portion 71 can be gradually come close to a right angle when the pair of side face portions 74 are directed to the back face portion 75. As shown in FIGS. 3 and 4, the upper face portion of the acrylic lens 70, the shape of which is flat, and the lower face of the protruding portion 62 of the lens holder 60 are fixed to each other by a pressure sensitive adhesive double coated tape (not shown).

Figure 10:
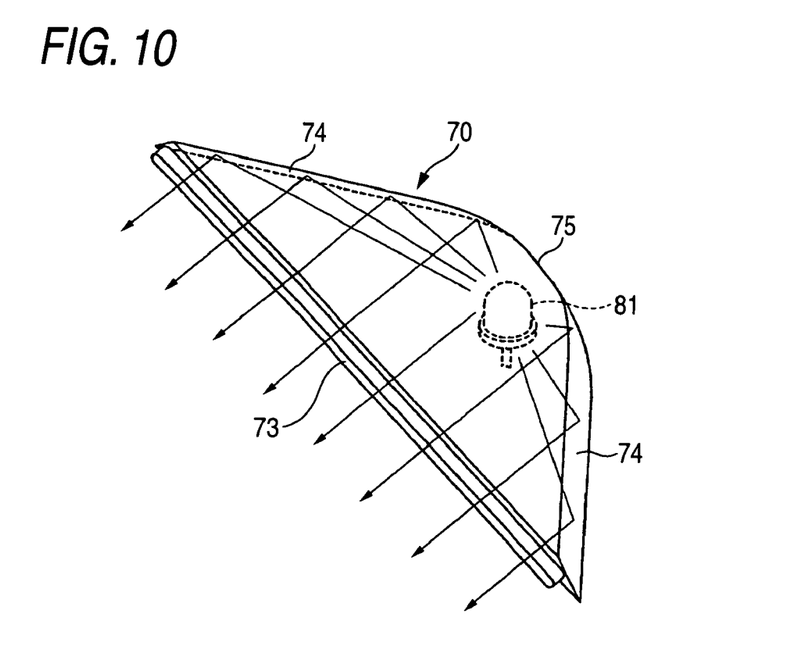
FIG. 10 is a perspective view showing a locus of the reflection of the incident light in the side portion of the acrylic lens illustrated in FIG. 5.

FIG. 10 is a perspective view showing a locus of the reflection of the incident light in the side portion of the acrylic lens shown in FIG. 5. Next, referring to FIG. 10, explanations will be made into the locus of the incident light in the pair of side face portions of the acrylic lens 70 incorporated into the disk player 1 of an embodiment of the present invention. First, light is incident upon the acrylic lens 70 from the bottom face portion 71 of the acrylic lens 70 when the blue light emitting diode 81 emits light. As shown in FIG. 10, the incident light radially spreads and reaches the overall faces of the pair of side face portions 74 of the acrylic lens 70. In this case, it is composed in such a manner that the pair of side face portions 74 are inclined by the angle of about 30 degrees on the plane with respect to the front face portion 73 (shown in FIG. 5) and also inclined by the angle of about 45 degrees on the plane with respect to the bottom face portion 71 (shown in FIG. 8). Therefore, the light incident from the bottom face portion 71 is reflected in the direction of the front face portion 73, the shape of which is long from side to side, of the acrylic lens 70 by the pair of side face portions 74.

In the present embodiment, as described above, the pair of side faces 74, which are opposed to each other, are inclined by about 30 degrees on the plane with respect to the front face 73. Further, the pair of side faces 74 are inclined by about 45 degrees on the plane with respect to the bottom face portion 71, and one blue light emitting diode 81 is arranged upward at a predetermined position below the bottom face portion 71 of the acrylic lens 70. Due to the above structure, the light incident from the bottom portion 71 can be reflected in the direction of the front face portion 73 by the pair of side face portions 74. Therefore, the light incident from the bottom face portion 71 can be effectively emergent from the linear front face portion 73, the shape of which is long from side to side. Due to the foregoing, when light is incident from the bottom face portion 71, the light can be effectively emitted from the front face portion 73, the shape of which is long from side to side. Therefore, light can be effectively emitted from the entire front face portion 73, the shape of which is long from side to side, by one blue light emitting diode 81.

In the present embodiment, when white printing for reflecting light is conducted on the surface of the upper face portion 72 of the acrylic lens 70, the shape of which is flat, as compared with a case in which white printing is not conducted on the surface of the upper face portion 72 of the lens, the light incident from the bottom face portion 71 can be effectively reflected in the direction of the front face portion 73 by the upper face portion 72. Therefore, the light incident from the bottom face portion 71 can be effectively emergent from the entire front face portion 73, the shape of which is long from side to side.

In the present embodiment, when the back face portion 75 is formed making a right angle with the bottom face portion 71 so that end portions of the pair of side face portions 74 can be connected and when the pair of side portions 74 are formed so that an inclination angle with respect to the bottom face portion 71 can be gradually come close to a right angle as the pair of side portions 74 are directed to the back face portion 75, it is possible to prevent the light incident from the bottom face portion 71 from being reflected in the direction of the front face portion 73 by the back face portion 75. Due to the foregoing, it is possible to prevent the occurrence of a problem in which a large quantity of light reflected in the inside of the acrylic lens 70 converges upon the periphery of the center of the front face portion 73, the shape of which is long from side to side, of the acrylic lens 70, and the shape of the blue light emitting diode 81 reflects in the periphery of the center of the front face portion 73. Therefore, it is possible to prevent the light emergent from the front face portion 73 of the acrylic lens 70 from deviating to one portion.

In the present embodiment, when a large number of fine irregularities are formed on the surfaces of the pair of side face portions 74 and the back face portion 75 of the acrylic lens 70 by means of crimping, the light incident from the bottom face portion 71 can be diffused when the light incident from the bottom face portion 71 is reflected by the pair of side portions 74 and the back face portion 75. Accordingly, the light emergent from the front face portion 73, the shape of which is long from side to side, of the acrylic lens 70 can be made uniform. When a large number of fine irregularities are formed on the front face of the front face portion 73 of the acrylic lens 70 by means of crimping, the light can be diffused when it is emergent from the front face portion 73. Accordingly, the light can be uniformly emitted from the front face portion 73.

In this connection, all the embodiments disclosed this time are exemplarily shown here from all viewpoints. Therefore, it should be noted that the present invention is not limited to those specific embodiments. The scope of the present invention is shown not by the explanations of the above embodiments but by the scope of claim of the present invention. All variations made by those skilled in that art according to the spirit and the scope of claim of the invention are included.

For example, in the embodiment described above, white printing is conducted on the upper face portion of the acrylic lens. However, the present invention is not limited to the above specific embodiment. As long as light can be reflected on the surface, the printing color of the surface is not limited to white.

In the above embodiment, the inclination angle of the pair of side face portions with respect to the bottom face portion gradually becomes close to a right angle as the pair of side face portions approach the back face portion. However, the present invention is not limited to the above specific embodiment. Under the condition that the inclination angle of the pair of side face portions with respect to the bottom face portion is maintained constant, the pair of side face portions may be connected to the back face portion.

In the above embodiment, fine irregularities are formed on the surfaces of both the pair of side face portions and the back face portion by means of crimping. However, the present invention is not limited to the above specific embodiment. Irregularities may be formed on one of the surfaces of the pair of side face portions and the back face portion. In the above embodiment, fine irregularities are formed by means of crimping. However, the present invention is not limited to the above specific embodiment. Fine irregularities may be formed not by means of crimping but by means of embossing.

In the above embodiment, the light emitting diode is used for the light source. However, the present invention is not limited to the above specific embodiment. Any light emitting means except for the light emitting diode may be used for the light emitting means.

In the above embodiment, the present invention is applied to a disk player which is an example of the electronic device of the present invention. However, the present invention is not limited to the above specific embodiment. The present invention can be applied to an electronic device such as a television set or a video tape player except for a disk player.

What is claimed is:

1. A disk player comprising:
   a front panel made of resin covering a front face of the disk player, the front panel including a panel side through-hole formed at predetermined position, which is long from side to side;
   a lens holder provided on an inner face side of the front panel and engaged in the panel side through-hole, the lens holder including a lens through-hole formed at a predetermined position;
   a lens made of acrylic resin, the shape of which is flat, fixed to the lens holder; and
   a light emitting diode attached to a base board provided in the disk player,
   wherein the lens is formed into a substantial trapezoid when it is viewed on a plane, wherein the lens includes;
   a bottom face portion upon which light is incident from the light emitting diode;
   an upper face portion, on the surface of which white printing is applied for reflecting light;
   a front face portion, which is linear and long from side to side, arranged so that the front face portion can be exposed from the lens through-hole of the lens holder to the front face, light being emergent forward from the front face portion;
   a pair of side portions, which are opposed to each other, for reflecting light sent from the bottom face portion to the front face portion, the pair of side portions being inclined by a predetermined acute angle with respect to the front face portion and also inclined by a predetermined acute angle with respect to the bottom face portion, irregularities being formed on the surfaces of the pair of side portions; and
   a back face portion provided so that end portions of the pair of side portions can be connected, making a substantial right angle with the bottom face portion, irregularities being formed on the surface of the back face portion, wherein the pair of side portions are formed so that an inclination angle with respect to the bottom face portion can gradually come close to a right angle as the pair of side portions is directed to the back face portion, and
   the light emitting diode, the number of which is one, is arranged upward at a predetermined position below the bottom face portion of the lens.

2. An electronic device comprising:
   a light source; and
   a flat lens including;
   a bottom face portion upon which light is incident from the light source,
   a front face portion, the shape of which is long from side to side, from which the light is emergent,
   a pair of side portions, which are opposed to each other, inclined by a predetermined acute angle with respect to the front face portion, and inclined by a predetermined acute angle with respect to the bottom face portion,
   wherein the pair of side portions reflect light sent from the bottom face portion in the direction of the front face portion, the lens is provided so that end portions of the pair of side portions can be connected, and wherein the lens further includes a back face portion making a substantial right angle with the bottom face portion, and wherein
   the pair of side portions are formed so that an inclination angle with respect to the bottom face portion can gradually come close to a right angle as the pair of side portions are directed to the back face portion.

3. The electronic device according to claim 2, wherein the lens further includes an upper face portion, on the surface of which printing is applied for reflecting light.

4. The electronic device according to claim 2, wherein fine irregularities are formed on the surface of at least one of the pair of side portions and the back face portion.

5. The electronic device according to claim 2, wherein the pair of side portions are inclined by 30 degrees with respect to the front face portion, and wherein the pair of side portions are inclined by 45 degrees with respect to the bottom face portion.

* * * * *